United States Patent [19]

Stein

[11] Patent Number: 4,993,799
[45] Date of Patent: Feb. 19, 1991

[54] ARRANGEMENT FOR ALIGNING A LENS AND OPTO-ELECTRONIC COMPONENT IN FREE BEAM TECHNOLOGY

[75] Inventor: Karl-Ulrich Stein, Unterhaching, Fed. Rep. of Germany

[73] Assignee: Siemens Aktiengesellschaft, Berlin and Munich, Fed. Rep. of Germany

[21] Appl. No.: 404,639

[22] Filed: Sep. 8, 1989

[30] Foreign Application Priority Data

Sep. 29, 1988 [DE] Fed. Rep. of Germany ....... 3833096

[51] Int. Cl.$^5$ .............................................. G02B 6/32
[52] U.S. Cl. .............................. 350/96.18; 350/96.20; 357/74
[58] Field of Search ............... 350/96.11, 96.12, 96.15, 350/96.17, 96.18, 96.20; 357/40, 74

[56] References Cited

U.S. PATENT DOCUMENTS

| | | | |
|---|---|---|---|
| 4,057,316 | 11/1977 | Hacman et al. | 350/1 |
| 4,057,319 | 11/1977 | Ash et al. | 350/96.22 |
| 4,310,216 | 1/1982 | Pellaux | 350/3.72 |
| 4,671,603 | 6/1987 | McQuoid et al. | 350/3.7 |
| 4,775,640 | 10/1988 | Chan | 350/96.11 X |
| 4,875,750 | 10/1989 | Spaeth et al. | 350/96.18 |

FOREIGN PATENT DOCUMENTS

| | | |
|---|---|---|
| 0037476 | 10/1981 | European Pat. Off. . |
| 0140175 | 5/1985 | European Pat. Off. . |
| 0280305 | 8/1988 | European Pat. Off. . |
| 2181567 | 4/1987 | United Kingdom . |

OTHER PUBLICATIONS

Fresnel phase plate lenses for through-wafer optical interconnections, by Lawrence A. Hornak, Sep. 1, 1987 vol. 26, No. 17, Applied Optics, pp. 3649–3654.
Patent Abstracts of Japan P-591 Jul. 2, 1987, vol. 11 No. 203.

*Primary Examiner*—John D. Lee
*Attorney, Agent, or Firm*—Hill, Van Santen, Steadman & Simpson

[57] ABSTRACT

An arrangement for the optical coupling of optical and/or opto-electronic components in free-beam technique includes a lens that is integrally formed with a semiconductor wafer. The semiconductor wafer simultaneously serves as an adjustable carrier. A planar Fresnel lens structure, Fresnel zone plate structure or holographic lens structure may be incorporated into the semiconductor wafer. The coupling arrangement of the invention is employed in light wave guide components and particularly laser modules.

15 Claims, 1 Drawing Sheet

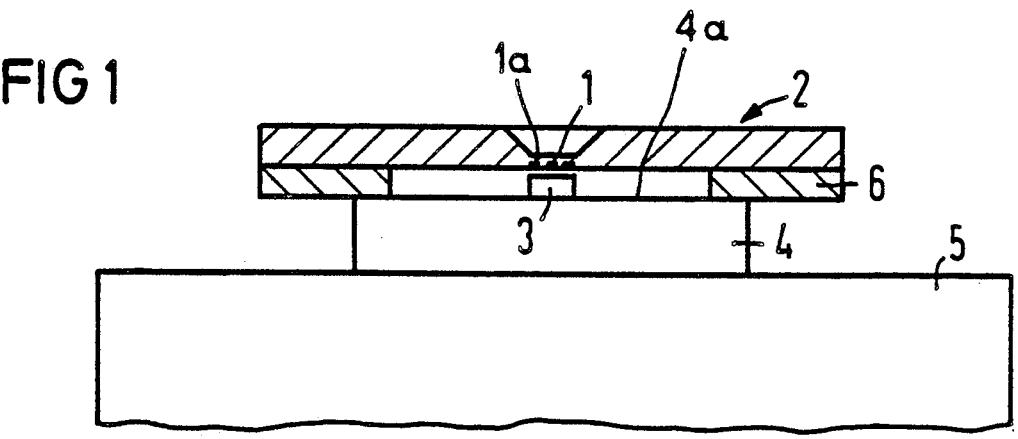
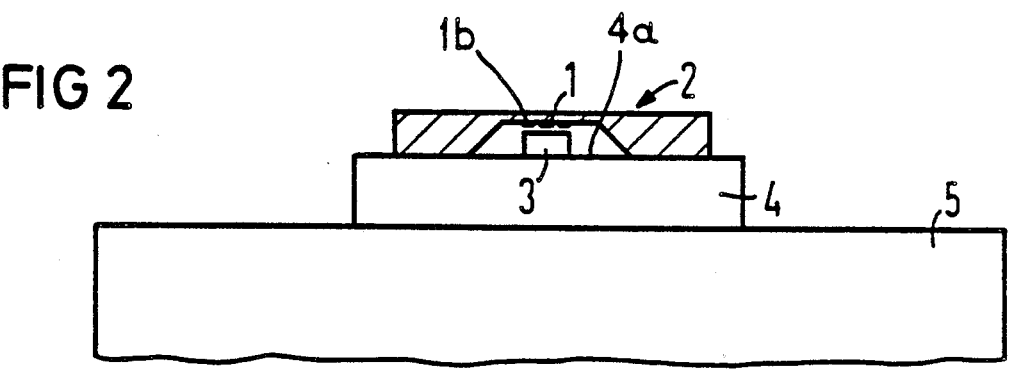

ARRANGEMENT FOR ALIGNING A LENS AND OPTO-ELECTRONIC COMPONENT IN FREE BEAM TECHNOLOGY

BACKGROUND OF THE INVENTION

1. Field of the Invention

The invention relates generally to an arrangement for the optical coupling of optical and/or opto-electronic components using free-beam technology.

2. Description of the Prior Art

In light wave guide transmission components, such as for laser modules or IRED modules and in reception components such as photo diodes or monitor diodes, there is the technical problem of optically coupling the opto-electronic semiconductor component or the semiconductor chip to a light wave guide in free-beam technology in an efficient way.

Hemispherical terminations of the light waveguide and, in part, spherical lenses between diodes and light wave guides serve this purpose of coupling the transmission component to the semiconductor component. Spherical lenses, however, involve considerable time and effort to mount and adjust.

It is known to employ a specially designed spherical lens carrier for such coupling purposes. The carrier may be manufactured using etching technology as a silicon part in micromechanics. Such a lens carrier is disclosed in European Patent Application No. 0 280 305.

SUMMARY OF THE INVENTION

An object of the invention is to greatly reduce the time and effort involved in the mounting and adjusting that occurs due to the employment of a spherical lens as an optical coupling element.

The object of the invention is achieved in a lens arrangement that is incorporated into a wafer of semiconductor material. The lens arrangement can be a planar Fresnel lens structure, a Fresnel zone plate lens structure or a holographic lens structure. The wafer of semiconductor material serves as an adjustable carrier for the lens structure. The wafer may be composed of silicon. According to the present invention, the optical component is a light wave guide and the opto-electronic component is a transmission or reception component.

Instead of using a spherical lens with a separate carrier, the optical coupling arrangement of the invention uses a planar lens that is preferably manufactured on silicon as a Fresnel lens, Fresnel zone plate or holographic lens using planar technology. At wavelengths of approximately 1 μm, silicon is transparent or only slightly attenuating. An amplitude pattern of opaque strips of, for example, metal and a phase pattern of grooves can be advantageously employed as a zone plate or as a holographic lens. The front and back side of the planar arrangement can be optically coated for transmission of the employed wavelength.

The imaging structure is produced by a mask from a submicron photolithography process, formed by an electron beam writing or manufactured as a hologram.

The particular advantage of the optical coupling arrangement of the invention is that the arrangement can be manufactured using sub-micron semiconductor technology. This manufacturing process yields the desired optical properties in planar chip form. A condenser can image the light source into the continuing optical system with optimum efficiency. The thickness of the silicon carrier of the zone plate is reduced to an inconsequential remaining thickness using a known etching process to diminish any disturbing factors.

Light wave guide components, such as a laser module with light wave guide and monitor diode, can be constructed in a very simple and economical way with the optical coupling arrangement of the invention. These arrangements of the present invention can also be incorporated into complex modules using free-beam techniques.

DESCRIPTION OF THE DRAWINGS

FIG. 1 is a side cross-sectional view of an optical coupling arrangement constructed in accordance with the present invention; and FIG. 2 is side a cross-sectional view of another embodiment of an optical coupling arrangement of the present invention.

DESCRIPTION OF THE PREFERRED EMBODIMENTS

The opto-electronic coupling arrangement shown in FIG. 1 includes a semiconductor wafer 2, preferably a silicon wafer, on which the lens 1 is applied as a planar Fresnel zone plate structure with a phase pattern of grooves 1a. The wafer 2, in contrast to known arrangements, simultaneously serves as a carrier for the lens 1. In a preferred embodiment, the lens structure of the invention has its edge region provided with a metallization 6 and connected via this metallization 6 to a carrier layer 4 that, for example, is composed of ceramic. The metallization spaces the lens 1 from the support surface 4a of the carrier 4. This carrier layer 4 also carries opto-electronic transmission or reception component 3. The carrier layer 4 is secured to a base plate 5 that, for example, is composed of metal. In this preferred embodiment, a depression is etched into the wafer 2 in the region of the structure of the lens 1 above, serving to reduce the remaining thickness of the wafer 2 in the optically active region. This reduced thickness is provided to improve the light transmission through the wafer 2 onto or from the optoelectronic component 3.

In the embodiment shown in FIG. 2, the wafer 2, which carries a Fresnel zone plate structure as lens 1 with amplitude pattern of opaque strips is directly secured on the carrier layer 4. The opaque strips, may be formed of metal. The carrier layer 4 is designed, for example, as a ceramic wafer that carries opto-electronic component 3. The overall arrangement is secured on a base plate 5 composed, for example, of metal. In this embodiment, the wafer 2 has its thickness in the optically active region reduced by etching, or the like, on its bottom side to form a depression which spaces the support surface 4a from the lens 1.

In both embodiments, the adjustment of the optical coupling arrangement can be undertaken by moving the wafer 2 about the support surface 4a of the carrier layer 4 before the final fastening. Thus, the integrated lens/-wafer forms an adjustable carrier which may be freely moved about the support surface 4a of the carrier 4 to facilitate adjustment of the lens 1 with respect to the electro-optical component 3.

Although modifications and changes may be suggested by those skilled in the art, it is the intention of the inventor to embody within the patent warranted hereon, all changes and modifications as reasonably and properly come within the contribution to the art.

I claim as my invention:

1. An optical coupling arrangement for use in free-beam technology, the optical coupling arrangement comprising:
   a semiconductor wafer;
   a carrier substrate having a support surface for supporting the semiconductor wafer;
   a lens integrally formed within the semiconductor wafer and spaced apart from the support surface of the carrier substrate; and
   an opto-electrical component disposed on the carrier substrate between the lens and the support surface of the carrier substrate, the semiconductor wafer adapted to be freely movable about the support surface of the carrier substrate for positionally adjusting the lens with respect to the opto-electrical component before the semiconductor wafer is finally fastened in a fixed position with respect to the carrier substrate.

2. An optical coupling arrangement as recited in claim 1, wherein the carrier substrate consists of a ceramic material.

3. An optical coupling arrangement as recited in claim 1, wherein the lens has a structure selected from the group consisting of a planar Fresnel lens, a Fresnel zone plate lens, and a holographic lens.

4. An optical coupling arrangement as recited in claim 1, wherein the semiconductor wafer is silicon.

5. An optical coupling arrangement as recited in claim 1, wherein the semiconductor wafer is directly secured to the support surface of the carrier substrate and wherein the lens is spaced apart from the support surface of the carrier substrate by a depression etched into the semiconductor wafer in a region of the lens.

6. An optical coupling arrangement as recited in claim 1, wherein the semiconductor wafer is supported indirectly by the support surface of the carrier substrate by metallization disposed between the semiconductor wafer and the support surface of the carrier substrate, the metallization being used to space apart the lens from the support surface of the carrier substrate.

7. An optical coupling arrangement as recited in claim 1, wherein the lens has a phase pattern of grooves at a surface thereof.

8. An optical coupling arrangement as recited in claim 1, wherein the lens has an amplitude pattern of opaque strips situated at a surface thereof.

9. An optical coupling arrangement as recited in claim 8, wherein the opaque strips consist of a metal material.

10. An optical coupling arrangement as recited in claim 1, wherein the lens is coated with an optically transmissive material.

11. An optical coupling arrangement as recited in claim 1, wherein the opto-electrical component is a transmission device.

12. An optical coupling arrangement as recited in claim 11, wherein the transmission device is a laser diode.

13. An optical coupling arrangement as recited in claim 1, wherein the opto-electrical component is a reception device.

14. An optical coupling arrangement as recited in claim 13, wherein the reception device is a monitor diode.

15. An optical coupling arrangement as recited in claim 1, wherein the semiconductor wafer has a reduced thickness at the lens.

* * * * *